United States Patent
Chang et al.

(10) Patent No.: US 9,109,782 B2
(45) Date of Patent: Aug. 18, 2015

(54) LED LIGHT EMITTING APPARATUS HAVING A LIGHT GUIDING DEVICE TO ACHIEVE A UNIFORM COLOR DISTRIBUTION

(71) Applicant: ADVANCED OPTOELECTRONIC TECHNOLOGY, INC., Hsinchu Hsien (TW)

(72) Inventors: Chung-Min Chang, Hsinchu (TW); Chien-Lin Chang-Chien, Hsinchu (TW); Hsuen-Feng Hu, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 202 days.

(21) Appl. No.: 13/859,703

(22) Filed: Apr. 9, 2013

(65) Prior Publication Data

US 2013/0279150 A1    Oct. 24, 2013

(30) Foreign Application Priority Data

Apr. 23, 2012    (CN) .......................... 2012 1 0119768

(51) Int. Cl.

| | |
|---|---|
| F21V 13/14 | (2006.01) |
| F21V 7/00 | (2006.01) |
| F21V 9/16 | (2006.01) |
| F21V 13/02 | (2006.01) |
| F21V 13/12 | (2006.01) |
| F21V 8/00 | (2006.01) |
| F21V 3/04 | (2006.01) |
| F21Y 101/02 | (2006.01) |
| F21Y 105/00 | (2006.01) |

(52) U.S. Cl.
CPC ............... *F21V 13/14* (2013.01); *F21V 3/0481* (2013.01); *F21V 7/0008* (2013.01); *F21V 9/16* (2013.01); *F21V 13/02* (2013.01); *F21V 13/12* (2013.01); *G02B 6/0001* (2013.01); *G02B 6/005* (2013.01); *F21Y 2101/02* (2013.01); *F21Y 2105/00* (2013.01)

(58) Field of Classification Search
USPC .................................... 362/84, 617, 618, 619
See application file for complete search history.

(56) References Cited

U.S. PATENT DOCUMENTS

| | | | |
|---|---|---|---|
| 2008/0158854 | A1 | 7/2008 | Matsui |
| 2008/0232084 | A1 | 9/2008 | Kon |
| 2009/0034292 | A1* | 2/2009 | Pokrovskiy et al. .......... 362/617 |
| 2010/0027293 | A1* | 2/2010 | Li ................. 362/619 |
| 2010/0033988 | A1 | 2/2010 | Chiu et al. |
| 2010/0321919 | A1* | 12/2010 | Yang ............... 362/84 |
| 2012/0249925 | A1* | 10/2012 | Yang ............... 349/65 |

FOREIGN PATENT DOCUMENTS

| | | |
|---|---|---|
| CN | 1993580 A | 7/2007 |
| CN | 101270854 A | 9/2008 |
| JP | 201033893 A | 2/2010 |
| TW | 200933087 A | 8/2009 |
| TW | 201007288 A | 2/2010 |

\* cited by examiner

*Primary Examiner* — Laura Tso

(74) *Attorney, Agent, or Firm* — Novak Druce Connolly Bove + Quigg LLP

(57) ABSTRACT

An LED light emitting apparatus includes an LED light source, a light guiding device and an emitting window. The emitting window is covered with a phosphor layer. Light emitted directly from the LED light source is first transmitted to the light guiding device and then guided by the light guiding device towards the emitting window to evenly excite the phosphor layer.

7 Claims, 4 Drawing Sheets

LED LIGHT EMITTING APPARATUS HAVING A LIGHT GUIDING DEVICE TO ACHIEVE A UNIFORM COLOR DISTRIBUTION

BACKGROUND

1. Technical Field

The present disclosure relates to a light emitting apparatus, and more particularly, to an LED light emitting apparatus having a light guiding device to achieve a uniform color distribution.

2. Description of Related Art

LEDs (light emitting diodes) have many advantages, such as high luminosity, low operational voltage, low power consumption, compatibility with integrated circuits, easy driving, long term reliability, and environmental friendliness. Such advantages have promoted the wide use of the LEDs as a light source. LED lamps commonly use LED chips covered with mixture of phosphor as light sources for illumination. Due to high directivity feature of light of LEDs, the light from the LED chip is difficult to evenly excite the phosphor, resulting in an uneven color distribution of light emitted from the lamps, or even local lighter/weaker spot on the illuminated area.

What is needed, therefore, is a light emitting apparatus which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
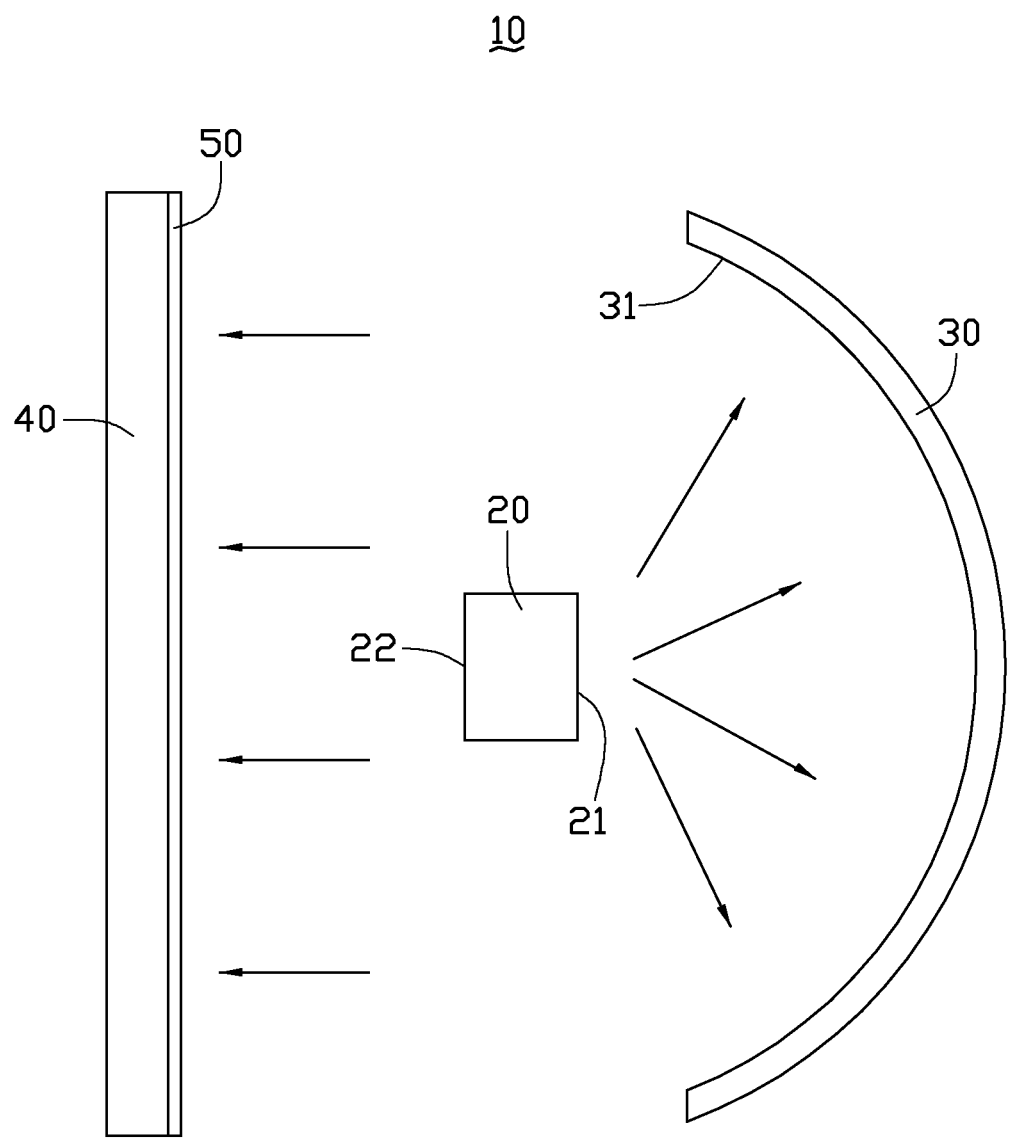
FIG. 1 is a schematic view of an LED light emitting apparatus in accordance with a first embodiment of the present disclosure.

Referring to FIG. 1, a light emitting apparatus 10 in accordance with a first embodiment of the present disclosure is shown. The light emitting apparatus 10 includes a light source 20, a light guiding device and an emitting window 40. The emitting window 40 is coated with a phosphor layer 50. Light emitted from the light source 20 is directed by the light guiding device to emit towards the emitting window 40 and excite the phosphor layer 50.

In this embodiment, the light source 20 is an LED including a light emitting surface 21 and a back surface 22. The LED may include a light emitting chip made of GaN, InGaN, AlInGaN or other semiconductor material. The LED can emit visible or invisible light when being activated. Preferably, the LED emits blue light when activated. The LED does not include any phosphor therein. The light emitting surface 21 faces the light guiding device. The light guiding device is a reflecting device 30 located on a right side of the light source 20, as viewed from FIG. 1. The reflecting device 30 includes a reflecting surface 31 facing the light source 20. The emitting surface 21 of the light source 20 faces the reflecting surface 31 of the reflecting device 30. The emitting window 40 is located on a left side of the light source 20. The back surface 22 of the light source 20 faces the emitting window 40. The phosphor layer 50 is coated on a surface of the emitting window 40 facing the light source 20. The phosphor layer 50 can be excited by light emitted from the light source 20, thereby producing a visible light having a color different from the light emitted from the light source 20. The phosphor layer 50 may be made of silicate, yttrium aluminium garnet or other suitable material. Preferably, the phosphor layer 50 may emit yellow light when absorbing the blue light emitted from the light source 20, whereby the yellow light can mix with the blue light to obtain white light. The reflecting surface 31 is a concave, curved surface. The light source 20 is arranged in a center position of the reflecting surface 31. Furthermore, the emitting surface 21 is arranged on a focal point of the reflecting surface 31. Light emitted from the light source 20 is reflected by the reflecting surface 31 to even, parallel light beams towards the phosphor layer 50. The even, parallel light then excites the phosphor layer 50 to produce the white light which passes through the emitting window 40 to an outside environment. Because the light reflected from the reflecting surface 31 is parallel and even, the phosphor layer 50 can be uniformly excited. As a result, light emergent from the emitting window 40 is distributed evenly without any localized strong or weak light spots and can have a uniform hue.

Figure 2:
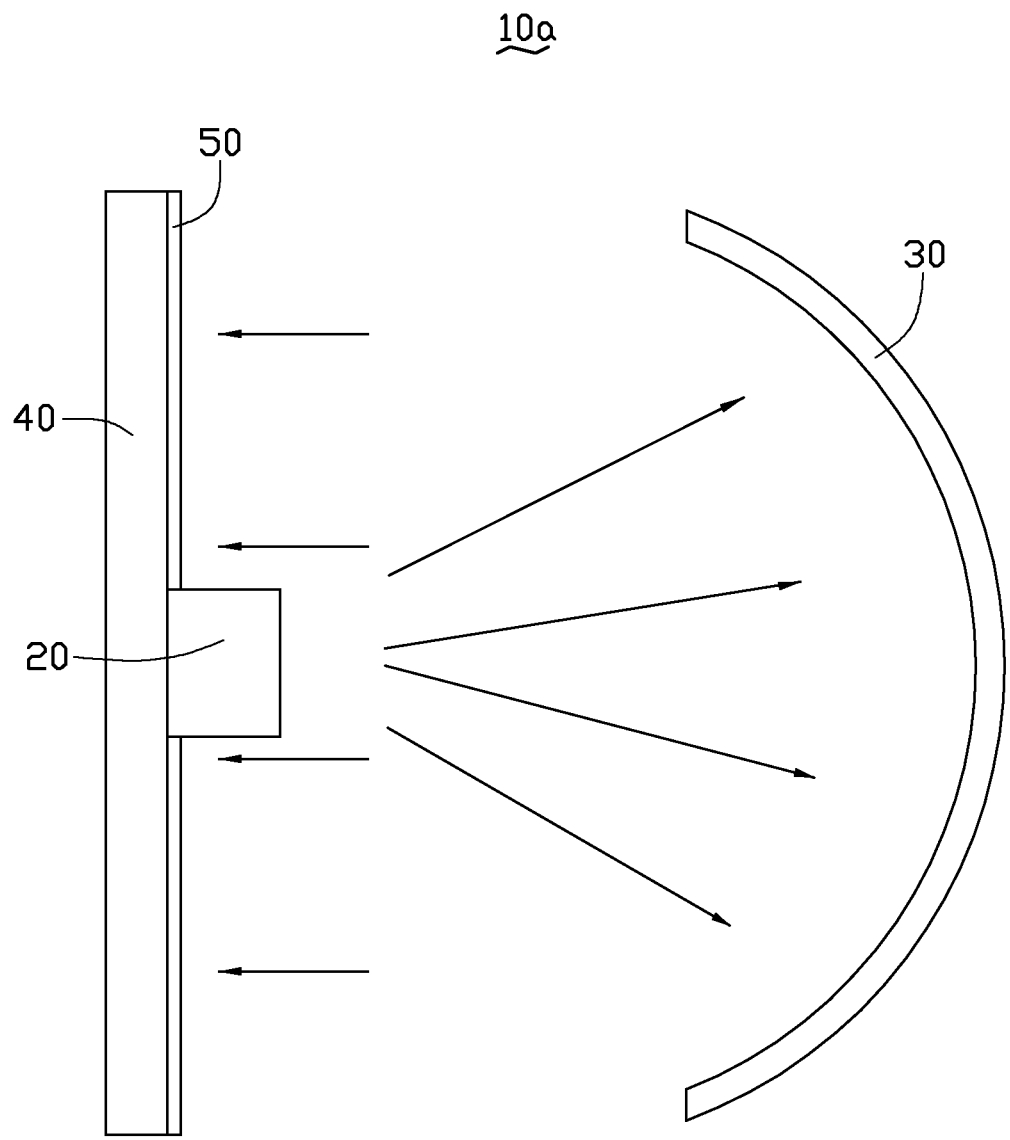
FIG. 2 is a schematic view of an LED light emitting apparatus in accordance with a second embodiment of the present disclosure.

Referring to FIG. 2, a light emitting apparatus 10a in accordance with a second embodiment of the present disclosure is shown. The light emitting apparatus 10a also includes a light source 20, a light guiding device, an emitting window 40 and a phosphor layer 50 coated on the emitting window 40. Similar to the first embodiment, the light guiding device is a reflecting device 30. Differences between the light emitting apparatus 10a of this embodiment and the light emitting apparatus 10 in the first embodiment are that the light source 20 of this embodiment is arranged on a surface of the emitting window 40 and the phosphor layer 50 surrounds the light source 20. The light source 20 directly contacts the surface of the emitting window 40 facing the reflecting device 30. The phosphor layer 50 defines a hole (not labeled) in a center thereof such that the light source 20 extends beyond the phosphor layer 50 through the hole. Light emitted from the light source 20 is reflected by the reflecting surface 31 to an even, parallel light towards the emitting window 40, and then excites the phosphor layer 50. In this embodiment, the light source 20 is still located at a focus plane of the reflecting surface 31.

Figure 3:
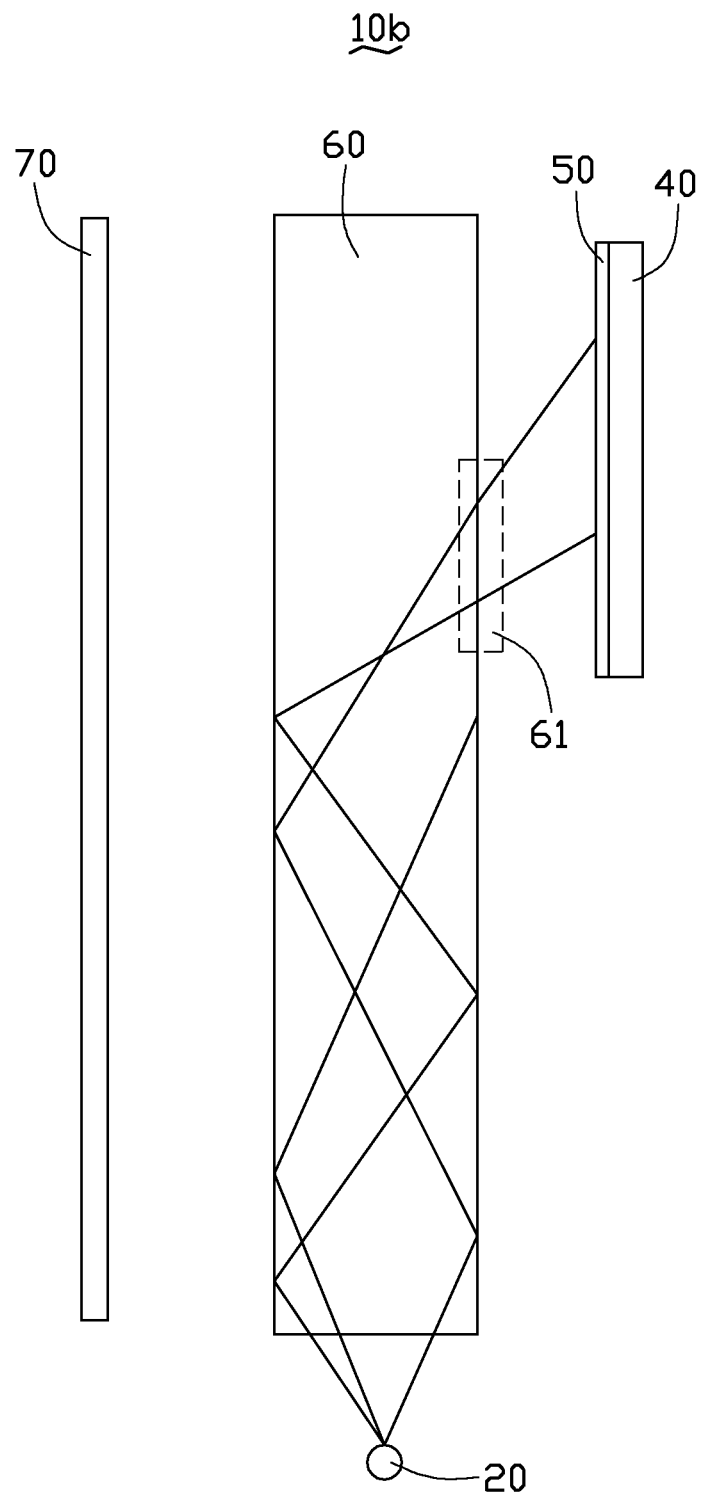
FIG. 3 is a schematic view of an LED light emitting apparatus in accordance with a third embodiment of the present disclosure.

Referring to FIG. 3, a light emitting apparatus 10b in accordance with a third embodiment of the present disclosure is shown. The light emitting apparatus 10b includes a light source 20, a light guiding device and an emitting window 40. The emitting window 40 is coated with a phosphor layer 50. Light emitted from the light source 20 is guided by the light guiding device towards the emitting window 40, and excites the phosphor layer 50. In this embodiment, the light source 20 is an LED point light source. The light guiding device is a light guiding plate 60. The light guiding plate 60 is flat and planar. The light source 20 is arranged at a bottom side of the light guiding plate 60. The emitting window 40 is arranged at a right side of the guiding plate 60 and near a top of the guiding plate 60. The light guiding plate 60 is made of transparent material having a high refractive index. Thus, light propagating inside the light guiding plate 60 has a total internal reflection at side walls of the light guiding plate 60. Furthermore, due to multiple total internal reflections within the light guiding plate 60, the light in the light guiding plate 60 can be uniformly mixed. A first emitting portion 61 is formed at a right side wall of the light guiding plate 60 corresponding to the emitting window 40. The first emitting portion 61 may include a rough structure which can include a large number of micro-convex/concave structures. Thus, the light total internal reflection at the first emitting portion 61 is destroyed and the light can evenly escape to an outside of the light guiding plate 60 after it is uniformly diffused by the first emitting portion 61. The light emitting apparatus 10b further includes a reflector 70. The reflector 70 is arranged at a left side of the light guiding plate 60 opposite to the emitting window 40. Light escaped from the light guiding plate 60 which is not reflected by the total internal reflection of the light guiding plate 60 is reflected by the reflector 70 to enter the emitting window 40. The light emitted directly from the light source 20 is guided by the light guiding plate 60 and scatters uniformly at the first emitting portion 61 and then radiates from the first emitting portion 61 to the phosphor layer 50. As a result, the uniformly scattered light can excite the phosphor layer 50 to obtain a uniform white light.

Figure 4:
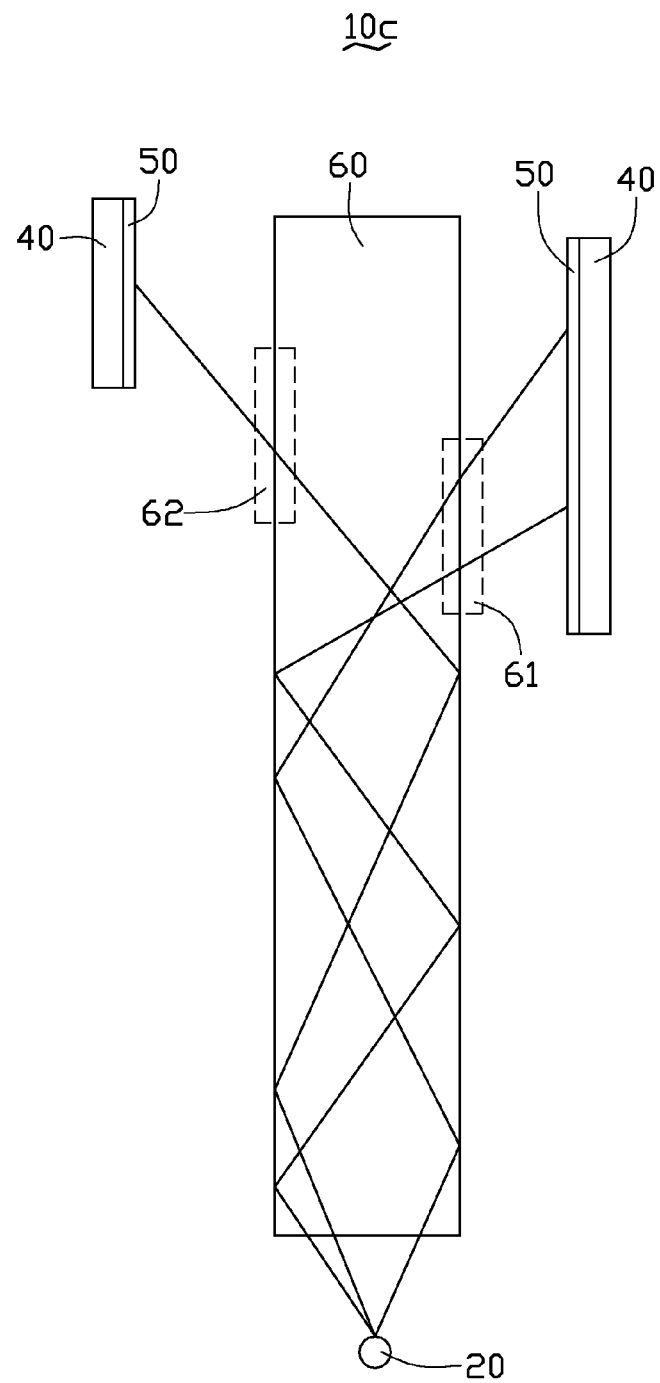
FIG. 4 is a schematic view of an LED light emitting apparatus in accordance with a fourth embodiment of the present disclosure.

Referring to FIG. 4, a light emitting apparatus 10c in accordance with a fourth embodiment of the present disclosure is shown. The light emitting apparatus 10c includes a light source 20, a light guiding device, two emitting windows 40 and two phosphor layers 50 coated on the two emitting windows 40 respectively. The two emitting windows 40 are located at different levels and have different lengths. Light emitted from the light source 20 is guided by the light guiding device to emit towards the emitting windows 40, and excites the phosphor layers 50. Similar to the third embodiment, the light guiding device is a light guiding plate 60. Differences between the light emitting apparatus 10c of this embodiment and the light emitting apparatus 10b in the third embodiment are that a second emitting portion 62 is formed at a left side wall of the light guiding plate 60. The two emitting windows 40 are respectively arranged at a right side and a left side of the light guiding plate 60 near a top of the light guiding plate 60. The first emitting portion 61 and the second emitting portion 62 are respectively corresponding to the two light emitting windows 40. The first emitting portion 61 and the second emitting portion 62 each may include a larger number of micro-convex/concave structures. Thus, total internal reflection at the first emitting portion 61 and the second emitting portion 62 is destroyed and light can evenly radiate outside the light guiding plate 60 from the first and second emitting portions 61, 62. The light emitted directly from the light source 20 is repeatedly totally internal reflected inside the light guiding plate 60 and uniformly scatters at the first emitting portion 61 and the second emitting portion 62 and radiates toward the phosphor layers 50 from the first and second emitting portions 60, 61. As a result, the uniformly scattered light can excite the two phosphor layers 50 to obtain uniform white light.

Since path of light is guided by the light guiding device, light emitted from the light source 20 can emit from the two emitting portions 61, 62 and excite phosphor layers 50 on the emitting windows 40 near the two emitting portions 61, 62. Thus, more than one region can be illuminated by a single light source 20.

In other embodiments, more than two emitting portions 61, 62 can be formed at the light guiding plate 60. Positions of the more than two emitting portions 61, 62 can be arranged at different side walls or the same side walls of the light guiding plate 60 in accordance with different demands.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An LED (light emitting diode) light emitting apparatus comprising:
   an LED light source;
   a light guiding device and an emitting window covered with a phosphor layer;
   wherein light emitted directly from the LED light source is first transmitted to the light guiding device and then guided by the light guiding device to move uniformly towards the emitting window to evenly excite the phosphor layer to generate a light having a color different from that of the light emitted directly from the LED light source; and
   wherein the LED light source directly contacts the surface of the emitting window and extends through the phosphor layer to face the light guiding device, and is surrounded by the phosphor layer.

2. The LED light emitting apparatus of claim 1, wherein the light guiding device is a reflecting device comprising a reflecting surface facing the LED light source.

3. The LED light emitting apparatus of claim 2, wherein the LED light source comprises a light emitting surface directly facing the reflecting surface of the reflecting device.

4. The LED light emitting apparatus of claim 3, wherein the LED light source further comprises a back surface, the light emitted from the light emitting surface is reflected by the reflecting surface towards the back surface of the LED light source.

5. The LED light emitting apparatus of claim 4, wherein the reflecting surface is a concave and curved surface.

6. The LED light emitting apparatus of claim 5, wherein the light emitting surface is arranged on a focal point of the reflecting surface whereby the light emitted from the LED light source is reflected by the reflecting surface to even, parallel light beams.

7. An LED (light emitting diode) light emitting apparatus comprising:
   an emitting window covered with a phosphor layer;
   a light source located on the emitting window;
   a light guiding device configured to guide light emitted from the light source to the emitting window; and
   wherein the light source directly contacts the surface of the emitting window and extends through the phosphor layer to face the light guiding device.

* * * * *